US011533312B2

(12) United States Patent
Kuppannan et al.

(10) Patent No.: US 11,533,312 B2
(45) Date of Patent: Dec. 20, 2022

(54) DYNAMICALLY ENFORCING CONTEXT SENSITIVE NETWORK ACCESS CONTROL POLICIES

(71) Applicant: COLORTOKENS, INC., Santa Clara, CA (US)

(72) Inventors: Jayaraghavendran Kuppannan, Bangalore (IN); Deepak Kushwaha, Bangalore (IN); Mahesh Raghuvir Bhat, Bangalore (IN); Arun Koshal, Khurja (IN); Vishal Sharma, Ghaziabad (IN); Sagar Singha, Bankura (IN)

(73) Assignee: COLORTOKENS, INC.

( * ) Notice: Subject to any disclaimer, the term of this patent is extended or adjusted under 35 U.S.C. 154(b) by 580 days.

(21) Appl. No.: 16/507,323

(22) Filed: Jul. 10, 2019

(65) Prior Publication Data
US 2021/0014233 A1    Jan. 14, 2021

(51) Int. Cl.
*H04L 9/40* (2022.01)
*H04L 61/256* (2022.01)

(52) U.S. Cl.
CPC ........ *H04L 63/102* (2013.01); *H04L 63/0209* (2013.01); *H04L 63/0263* (2013.01); *H04L 63/0272* (2013.01); *H04L 63/205* (2013.01); *H04L 61/256* (2013.01)

(58) Field of Classification Search
CPC .............. H04L 61/256; H04L 63/0209; H04L 63/0263; H04L 63/0272; H04L 63/0281; H04L 63/107; H04L 63/20; H04L 67/148
See application file for complete search history.

(56) References Cited

U.S. PATENT DOCUMENTS

| 8,528,059 | B1* | 9/2013 | Labana | H04L 63/08 726/5 |
| 9,565,059 | B1* | 2/2017 | Manmohan | H04L 63/20 |
| 2003/0012205 | A1* | 1/2003 | Foti | H04L 61/00 370/401 |
| 2004/0225895 | A1* | 11/2004 | Mukherjee | H04L 63/164 726/15 |

(Continued)

*Primary Examiner* — Eric W Shepperd
(74) *Attorney, Agent, or Firm* — Barry Choobin; Patent 360 LLC

(57) ABSTRACT

The present disclosure envisages enforcing micro-segmentation policies on a user computer that intermittently migrates between a secured enterprise network and an unsecured network, for instance, a public network. The present disclosure envisages switching between appropriate micro-segmentation policies, in-line with the change in the current location of the user device, the change triggered by the user device migrating from the enterprise network to an unsecured network or vice-versa. The present disclosure envisages selectively enforcing micro-segmentation policies upon a user device based on the current location thereof, such that the micro-segmentation policies and the corresponding access permissions assigned to the user device differ in line with the current location of the user device, thereby exposing sensitive enterprise resources, forming a part of the enterprise network, in a selective and restricted manner, in line with the micro-segmentation policies enforced upon the user device based primarily on the current location of the user device.

8 Claims, 7 Drawing Sheets

(56) References Cited

U.S. PATENT DOCUMENTS

| | | | |
|---|---|---|---|
| 2005/0117605 A1* | 6/2005 | Yan | H04L 65/1101 |
| | | | 370/469 |
| 2007/0143851 A1* | 6/2007 | Nicodemus | G06F 21/577 |
| | | | 726/25 |
| 2009/0307753 A1* | 12/2009 | Dupont | H04L 63/0272 |
| | | | 726/3 |
| 2014/0201808 A1* | 7/2014 | Yada | H04L 67/18 |
| | | | 726/1 |
| 2016/0173535 A1* | 6/2016 | Barabash | H04L 41/0893 |
| | | | 726/1 |
| 2017/0353496 A1* | 12/2017 | Pai | H04L 63/10 |

* cited by examiner

DYNAMICALLY ENFORCING CONTEXT SENSITIVE NETWORK ACCESS CONTROL POLICIES

BACKGROUND

Technical Field

The present disclosure relates to (computer-implemented) systems and methods that facilitate the creation of network access control policies. Particularly, the present disclosure relates to systems and methods that facilitate context-aware network access control policies. More particularly, the present disclosure relates to systems and methods that provide network users with micro-segmentation oriented conditional access to enterprise servers in-line with predetermined context-aware access control policies.

Description of Related Art

Typically, data communication and data processing needs of a large enterprise warrant an equally humungous, efficient network infrastructure. Normally, a network infrastructure catering to the data processing and data communication requirements of large enterprises incorporate numerous computer systems as well as a multitude of workgroups selectively interconnected using varying network topologies and rendered accessible via mutually different network interface units. Typically, large enterprises prefer (the implementation of) enterprise networks which, as discussed above, constitute an interconnection between a multitude of computer-based devices and computer-accessible resources (for example, enterprise servers, enterprise applications, enterprise databases, internal network interfaces, external network interfaces, printers and the like—also referred to as 'enterprise network assets') spread across multiple departments of an enterprise. Typically, enterprise networks are preferred over the conventional service provider networks since the enterprise networks provide, inter-alia, better connectivity, and communicative ability among constituent computer-based devices and computer-based resources, and also bring about a reduction in the use of varied communication protocols while enhancing the interoperability between the constituent computer-based devices and computer-accessible resources.

Enterprise networks often form the backbone of the enterprises' communication network, and support interconnection between a multitude of computer-based devices (typically storing or having access to sensitive enterprise data) and computer-accessible resources (printers, fax machines, data stores, and the like) dispersed across various geographically distant locations. Enterprise networks are best suited to eliminate isolated users and isolated workgroups and to facilitate seamless data communication between geographically dispersed computer-based devices and computer-accessible resources.

In addition to the advantages specified above, enterprise networks also bring about an improvement in internal as well as external enterprise data management. Further, an enterprise network is preferred over a conventional service provider network since it facilitates virtual integration of (a multitude of) user computers (computer-based devices), workgroups, and eliminates isolated users and workgroups. Another advantage of enterprise networks vis-a-vis the conventional service provider networks is that they enable each of the user computers and workgroups to communicate seamlessly, all the while exhibiting adherence to predefined (industry recognized) performance, reliability and security standards.

Since typical enterprise networks function as the backbone of an enterprise computing environment, they are often interlinked with and consequentially provide access to in-house database systems storing sensitive organizational information, multitude of computer-based devices generating and accessing sensitive organization information, multitude of online services hosted across the enterprise computing environment, and every online activity occurring across the enterprise computing environment. Given that all the sensitive information and all the online activities of the organization (including hosting and implementation of consumer services, consumer and partner interactions, data communications, billing and related financial activities, payroll processing, and the like) are hosted on the enterprise network, it is imperative that the enterprise network is safeguarded against intrusions from external sources, for example, computer-based devices external to the enterprise network, possibly accessible to users with a malicious intent, for example, network hackers.

One of the prior-art solutions for safeguarding enterprise networks from intrusions envisaged segregating the internal data traffic (network traffic internal to the enterprise network) of an organization from the external data traffic (network traffic external to the enterprise network) based on the premonition that the internal network traffic is trustworthy while the external network traffic is not. Consequentially, any (computer-based) device having access to the enterprise network and regarded as involved in sending and/or receiving data traffic internal to the enterprise network, is allowed to communicate with and elicit information from any other computer-based device and/or computer-accessible resource on the enterprise network, based on the premonition that the said computer-based device is internal to the enterprise network and therefore trustworthy. On the contrary, any computer-based device external to the enterprise network, albeit accessible to a legitimate employee of the organization, is categorized, rather unwittingly, as a security threat, and is consequentially barred from accessing any computer-based devices and computer-accessible resources internal to the enterprise network. One of the major drawbacks associated with the aforementioned prior-art solution is the hard categorization of every computer-based device attempting to access the enterprise network as either an internal device or an external device, and the consequential allowance or blockage of enterprise network access solely based on the status of the (computer-based) device. Yet another drawback stemming from the hard categorization of a computer-based device as either an external device or an internal device is that a legitimate employee requiring access to the enterprise network could be denied the required access only because his computer-based device was classified as being external to the enterprise network (at least during when the computer-based device requests access to the enterprise network), and a network hacker who manages to hack into the enterprise network with a malicious intent is provided with uninterrupted access to the computer-based devices and computer-accessible resources constituting the enterprise network only because the hacker's device despite having gained a wrongful entry (into the enterprise network) is classified as a device internal to the enterprise network.

To overcome the (aforementioned) drawbacks associated with the hard categorization of computer-based devices as either external to the enterprise network or internal to the enterprise network, yet another prior-art solution which involved segregating data traffic on a department level was introduced. This prior-art solution provided for computer-based devices in different departments to be separately hardwired to the enterprise network such that the computer-based devices were physically separated at the department level and (computer-based) devices associated with a particular department were never allowed communicate with devices assigned to a different department. However, departmentalization and consequential creation of isolated groups of computer-based devices allowed very little leeway for reconfiguration (of groups), resulted in (computer-based device) groups that were non-scalable, difficult to maintain, and did not account for mobile phones which need not be hardwired to any group of computer-based devices, but could still be communicably coupled with a group via a wireless Internet connection.

To overcome the (aforementioned) drawbacks associated with the phenomenon of creation of isolated groups of computer-based devices, edge firewalls, which functioned as a bridge connecting the enterprise network with external networks and continually monitored the data traffic transmitted to and from the enterprise network, were envisaged. One of the disadvantages with edge firewalls was that an edge firewall, as the name suggests, focused only protected the boundary points—which are in turn defined by end-point devices—and the external threats typically directed at the boundary points, all the while inadvertently overlooking the possibility of a network attack launched from within the enterprise network, via malware injected from any of the computer-based devices or computer-accessible resources internal to the internal network. The presence of malware within the enterprise network does not trigger an edge firewall as long as the said malware does not propagate through any of the boundary points monitored by the edge firewall, and it is this characteristic of the edge firewalls that renders then ineffective against network attacks launched from within the enterprise network.

Another alternative to edge firewalls were network intrusion detection systems (NIDS) which monitors all the data traffic inbound to the enterprise network and detects any nefarious or suspicious activities based on the analysis of (the) data traffic, and consequentially creates notifications describing such nefarious/suspicious activities as a cue for network administrators. But one of the major drawbacks associated with network intrusion detection systems—stemming, at least in part, from the fact that they don't essentially block or prevent nefarious/suspicious activities but only uncovers such activities—is that they are highly dependent on qualified personnel (for example, network administrators) continually monitoring and analyzing the cues generated therefrom, and undertaking timely counteraction to nullify the often harmful effects of the nefarious/suspicious activities detected by the NIDS. Yet another major drawback associated with NIDS is that they often generate 'false positive' alerts—a false alert indicating a non-existing threat/vulnerability—compelling network administrators to spend a significant amount of time and effort on monitoring such 'false positive' alarms basis the intuition that any of such false positive alarms may indeed indicate a genuine security violation. Some of the other disadvantages of NIDS include an inability to analyze encrypted data packets, inability to differentiate between ingenuine data packets (data packets incorporating a fake source IP address) and genuine data packets—which in turn could render the enterprise network vulnerable to a network attack triggered via ingenuine data packets, and increased susceptibility to protocol based network attacks.

Another prior-art solution for safeguarding enterprise networks from intrusions envisaged combining any of the aforementioned security products and arranging the combination of security products such that each portion of the enterprise network is monitored by a specific security product (selected from the combination thereof). While this solution covers the enterprise network in its entirety, it falls short of providing a common, comprehensive protection scheme (across the enterprise network) given the fact that each of the security products is restricted to individual portions of the enterprise network. Also, attempts to correlate the said combination of security products to create a pan-enterprise network security apparatus entail significant cost and management related overheads in addition to imposing network scalability related challenges.

The data security-related challenges attributed to conventional virtual private networks and, by extension, to conventional enterprise networks rendered accessible via (conventional) virtual private networks are manifold. For instance, whenever a remote resource having set up a connection to an enterprise network via a virtual private network, manages to either bypass or overcome the user authentication functions employed at the application level of the virtual private network and access the enterprise network, the said remote resource is provided with unhindered access to all the computer-based devices and computer-accessible resources (enterprise network assets) constituting the enterprise network, notwithstanding the fact that the identity and trustworthiness of the remote resource are, in a best-case scenario, questionable. Further, it is also possible that a remote resource is used, with malicious intentions, to access a secured enterprise network illegally—either by way of bypassing the VPN specific authentication functions deployed at the perimeter of the enterprise network or by hoodwinking the said VPN specific authentication functions about the genuineness of the remote resource requesting access to the enterprise network—and to subsequently eavesdrop on the sensitive information shared across the enterprise network (via the virtual private network) and also to launch a variety of cyber-security attacks—including Denial of Service (DOS), Man-in-the-Middle attack, SQL injection attack, phishing, malware insertion, password attack and the like—which in turn not only jeopardize the entire information technology infrastructure of an enterprise but also cause dissipation of sensitive and otherwise confidential enterprise data, which when misused could trigger irreversible financial losses in addition to, at the least, a loss of entrepreneurial credibility and consumer goodwill.

Further, conventional enterprise firewalls that typically protect enterprise networks from unauthorized access and possible consequential network security breaches are not typically configured to provide selective access to requesting computer-based devices based on the location thereof. Additionally, conventional enterprise firewalls do not typically facilitate the implementation of location-based granular and micro-segmentation oriented access control policies. While some of the enterprise firewalls are programmed, either to enforce a blanket ban on providing (requesting) 'computer-based devices' with access to certain portions of the enterprise networks predetermined to be sensitive, or to provide blanket access rights to requesting computer-based devices as long as they are determined to be present within the perimeter of the enterprise network, no conventional enterprise firewall has possibly been configured to selectively and dynamically deviate between granting and withholding, to the requesting computer-based devices, access, either to the entire enterprise network or to at-least certain portions of the enterprise network predesignated as sensitive, based on the current location of the individual requesting computer-based devices. Further, no conventional enterprise firewalls has possibly been configured to implement granular access permissions and the consequential access restrictions upon requesting computer-based devices, solely in view of (and based on) the current location of (the) requesting computing device, and the credibility perceived to be associated with the current location of the requesting computing device (i.e., a requesting computing device identified to be present within the enterprise network is regarded to be trustworthy in comparison to a requesting computing device requesting remote access to the enterprise network). Additionally, since it is probable that the remote resource—requesting access to the enterprise network—is typically communicably coupled to a Network Address Translation (NAT) enabled virtual private network and a NAT enabled enterprise network, it is necessary that any micro-segmentation oriented policy created in order to provide the remote resource with selective access to the enterprise network via the VPN, is rendered NAT-aware. The fact that none of the typical enterprise firewall policies/rules are NAT-aware makes the implementation of micro-segmentation oriented policies on an enterprise firewall all the more challenging.

The drawbacks associated with conventional enterprise firewalls have been overcome, at least partially, with the introduction of network micro-segmentation. The phenomenon of network micro-segmentation provides for micro-segmentation policies embodying fine-grained network security rules to be implemented upon individual computer-based devices and computer-based resources (enterprise resources) forming a part of the enterprise network, thereby providing requesting user devices (computer-based devices accessible to users, and used for requesting access to the enterprise) with isolated access to selected enterprise resources. Typically, micro-segmentation policies incorporate rules, often preconfigured, to allow specific, predetermined user devices (identified primarily via corresponding IP addresses) preassigned to specific users, often the employees of an enterprise, to access predetermined enterprise resources. Traditionally, different micro-segmentation policies inhibit different access permission types, different access permission levels, create different isolated (enterprise) resource groups, and consequentially control (the) access to different isolated (enterprise) resource groups. Given the diversity in the security characteristics exhibited by traditional micro-segmentation policies, it is often difficult, if not impossible, to accommodate into the micro-segmentation paradigm the user devices which request access to the enterprise resources, from outside the enterprise network. Therefore, traditional micro-segmentation policies are hardcoded to deny access to any user device identified to be present outside the enterprise network, notwithstanding the possibility that an employee of the enterprise could have accessed such a (requesting) user device. Typically, the juxtaposition of enterprise networks, VPNs and micro-segmentation oriented access control policies is at times hindered by the inability on the part of micro-segmentation oriented access control policies to recognize a genuine user (for example, an employee of an enterprise) requesting access to the enterprise network from a device location which is outside the perimeter of the enterprise network, albeit with a computer-device that has been directly associated (either via ownership or leasing) with the enterprise.

Therefore, given the drawbacks (of conventional virtual private networks and corresponding firewalls) and challenges discussed above, there was felt a need for an improvised network architecture on the whole which facilitates micro-segmentation oriented access to user devices connecting to an enterprise network via a conventional virtual private network. Additionally, there was felt a need to facilitate seamless and dynamic switching among various (micro-segmentation oriented) access control policies in-line with a current location of a user device (requesting access to an enterprise network and in turn the sensitive enterprise resources). Additionally, there was also felt a need for creating a network architecture capable of responding to any changes in the location of a user device (requesting access to an enterprise network) and consequentially implementing, in a selective manner, different micro-segmentation policies that exhibit different access control rules basis (a) current location of the user device. Further, there was felt a need also for a network architecture and specially for a (micro-segmentation) policy controller that did not warrant reconfiguration of enterprise firewall rules—preferably implemented on an enterprise server to regulate access to the enterprise network and constituent enterprise resources—to incorporate 'external P addresses' of user devices (requesting access to an enterprise network via a VPN and from a location external to the enterprise network) thereto—a phenomenon, if implemented would have inadvertently exposed the enterprise server's IP address in an event the firewall rules implementable to the server are exposed to user devices external to the enterprise network, and therefore deemed possibly untrustworthy, and would have ostensibly resulted in (such untrustworthy) user devices having an unhindered, blanket access to the entire enterprise network, and would have rendered the enterprise network vulnerable to external cyber-security attacks and possibly resulted in confidential enterprise data being stolen and misused as a consequence of such cyber-security attacks—but executes micro-segmentation policies solely based on the location of the user device and provides (the) user device with selective and secured access to enterprise network and in turn the corresponding network resources; with the current location of the user device serving as a sole benchmark for determining the trustworthiness thereof.

Objects

An object of the present disclosure is to envisage a network architecture and preferably an enterprise network architecture sensitive to any changes in the location of a user device requesting access to the enterprise network.

Another object of the present disclosure is to envisage a network security scheme that augments conventional VPN specific authentication with micro-segmentation oriented granular access control policies and provides user devices with selective and secured granular access to enterprise resources.

Still a further object of the present disclosure is to envisage a network security scheme that determines the trustworthiness of a user device (requesting access to an enterprise network) based on the current location thereof, and in turn renders enterprise resources accessible to the user device in-line with micro-segmentation policies created specifically in view of the current location of the user device.

Another object of the present disclosure is to facilitate a seamless amalgamation of the location-based micro-segmentation policies with VPN specific authentication policies. One more object of the present disclosure is to envisage the creation of NAT-aware micro-segmentation oriented access control policies.

Still a further object of the present disclosure is to envisage a network security scheme that does not necessitate a reconfiguration of enterprise firewall rules for the inclusion of external IP addresses corresponding to user devices (requesting access to an enterprise network) thereto, and thereby consequentially preventing the enterprise firewall from being breached by cyber-security attacks.

Another object of the present disclosure is to envisage different micro-segmentation policies for user devices determined to be present within an enterprise network and for user devices determined to be external to the enterprise network.

One more object of the present disclosure is to envisage a network security scheme that transforms a conventional host-based firewall into a micro-segmentation oriented, NAT-aware firewall that regulates network access based on the current location of the requesting user device.

Another object of the present disclosure is to envisage a network security scheme that transforms a conventional VPN endpoint into a NAT-aware VPN endpoint capable of implementing location specific micro-segmentation policies and functioning as a proxy (micro-segmentation) policy enforcement point.

SUMMARY

The present disclosure envisages a computer-implemented method, computer-implemented system and a computer program product configured to create and subsequently enforce context sensitive micro-segmentation policies upon user devices requesting access to an enterprise network. The present disclosure attempts to overcome the drawbacks associated with the juxtaposition of micro-segmentation oriented access control policies and the combination of a virtual private network and a conventional enterprise network. While conventional network security architectures and micro-segmentation policy controllers are hardcoded to deny access to any user device situated outside the enterprise network, the method, system and the computer program product envisaged by the present disclosure envisage selectively enforcing micro-segmentation policies onto user devices requesting access to an enterprise network, based on the contextual information associated with the requesting user device, including the current location of the requesting user device.

As envisaged by the present disclosure, the identification of the current location of the requesting user device, the broadest yet accurate classification of the requesting user device as present at a location within the enterprise network or at a location outside the enterprise network, is used as an indicator for associating a relevant security context with the requesting user device.

Typically, the security context associated with the user device dictates the security control mechanism applicable to the requesting user device. Further, the security control mechanism deemed applicable to a particular requesting user device reflects, inter-alia, the access privileges accorded to the user (of the requesting user device), the enterprise resources the user is allowed to access, including the micro-segmented work nodes (also referenced as enterprise resources) the user is allowed to access, and the data manipulation related operations (for example, a data read operation, a data write operation, and a read-write operation) the user is allowed to perform on the micro-segmented work nodes. Also, the security context accorded to a user device also dictates, inter-alia, the ports, and the protocols to be used by the requesting user device for communicating with (predesignated) micro-segmented work nodes. Ostensibly, the security context associated with a (requesting) user device identified to be present within the enterprise network is different from the security context associated with a user device identified to be located outside the enterprise network.

In accordance with the present disclosure, when a (requesting) user device is determined to be located within the enterprise network, i.e., when a user device is requesting access to an enterprise resource from within the enterprise network, the security context assigned to such a requesting user device embodies at least one micro-segmentation oriented access control policy, which in turn accords the requesting user device with selective and controlled access to the requested enterprise resource. Further, when a (requesting) user device is determined to be located outside the enterprise network, i.e., when a user device located outside the enterprise network requests access to an enterprise resource, the security context assigned to such a (requesting device) differs primarily in that it embodies a micro-segmentation policy that covers not only the access privileges accorded to the requesting user device but also to the VPN endpoint through which the (requesting) user device intends to access the (requested) enterprise resource.

The present disclosure intends to overcome the lack of flexibility associated with conventional network security systems and enterprise firewalls in terms of adapting to a change in the current location of a (requesting) user device and implementing micro-segmentation policies relevant, preferably solely, but at least in part, to the current location of the requesting user device, and therefore envisages a flexible network security scheme that dynamically switches between different micro-segmentation policies, based (primarily and preferably only) on any changes to the current location of the requesting user device.

The system, method, computer program product and the overall network security scheme envisaged by the present disclosure allows for the location of a user device—a computer-based device that requests access to an enterprise network and any of the enterprise resources connected thereto—and dynamically decides upon an appropriate micro-segmentation policy to be enforced upon the user device, depending upon the current location thereof. Ostensibly, any changes to the location of the user device also trigger a consequential change of the micro-segmentation policy (and the corresponding access privileges and data security characteristics) enforced on the requesting user device.

Ideally, a security context is associated with a user device requesting access to the enterprise network, when the user device is determined to be present within (the perimeter of) the enterprise network), i.e., inside the enterprise network. Accordingly, at least one micro-segmentation policy is created in line with the security context, and the requesting user device is accorded access privileges providing selective access to the requested enterprise resource, in line with the said micro-segmentation policy. And when the (requesting) user device migrates from a location within the enterprise network to a location outside the enterprise network, i.e., the user device attempts to access the enterprise network via a VPN endpoint acting as a proxy user device, such a change in the location of the requesting user device and a consequential change in the pattern in which the access to enterprise resource is requested (the request—to access the enterprise resource—routed via a VPN endpoint instead of a direct request) is identified, with the user device now being classified (re-identified) as a 'remote' user device.

Subsequently, the security context previously associated with the user device (i.e., prior to the reidentification of the user device as a remote device) is nullified, and a new security context applicable to the VPN endpoint (acting as a proxy user device) as well as to the remote user device, and accounting for a change of the location of the user device and the consequential classification of the user device as a remote device is generated. Subsequently, the new security context thus generated is used as a basis for generating new micro-segmentation policies enforceable on the VPN endpoint (functioning as a proxy to the remote user device), the remote user device requesting access to an enterprise resource via the VPN endpoint, and the enterprise resource (requested access to). Subsequently, the newly derived micro-segmentation policies are enforced, preferably simultaneously, on the VPN endpoint, the remote user device, and the enterprise resource (requested access to). Ostensibly, the newly generated micro-segmentation policies enforceable on the remote user device are different than the micro-segmentation policy enforced on the user device when the latter was determined to be located within the enterprise network.

DETAILED DESCRIPTION

Figure 1:
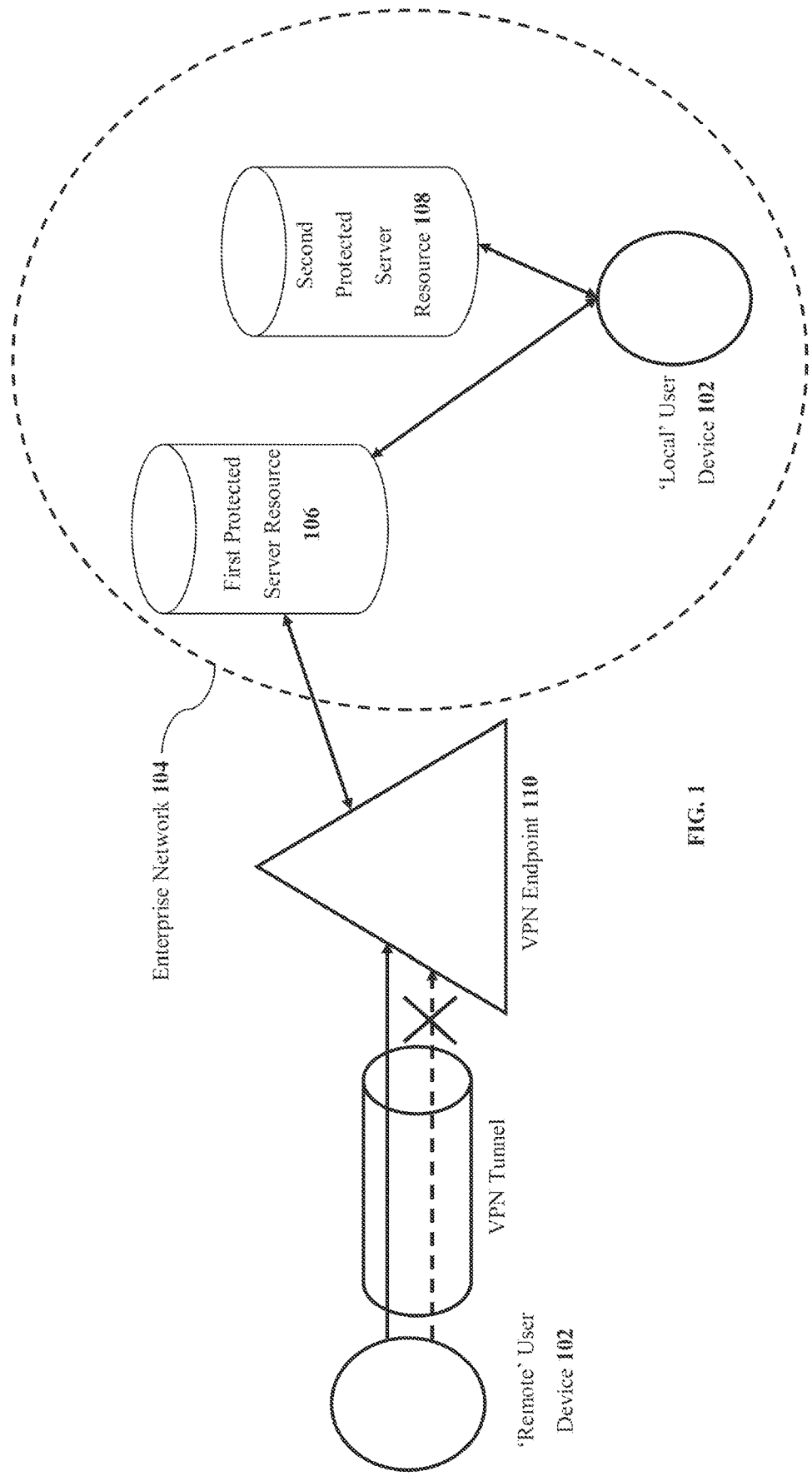
FIG. 1 is a block diagram describing a broad overview of how the computer-implemented system of the present disclosure is implemented in a typical network environment.

The present disclosure envisages a computer-implemented method, computer-implemented system and a computer program product for enforcing micro-segmentation policies on a user computer (also referred to as a 'user device') that intermittently migrates between a secured enterprise network and an unsecured network, for example, a public data network. The present disclosure envisages switching between appropriate micro-segmentation policies, in-line with the change in the current location of the user device, a consequence of the user device migrating from the secured enterprise network to the unsecured network or vice-versa. The present disclosure envisages selectively pushing/enforcing micro-segmentation policies onto a user device based on the current location thereof, such that the micro-segmentation policies and the corresponding access permissions assigned to the user device also differ in line with the current location of the user device, thereby exposing sensitive enterprise resources—forming a part of the enterprise network—in a selective and restricted manner, in line with the (specific) micro-segmentation policies enforced upon the user device based primarily on the current location of the user device.

The present disclosure abstains from denying the user device access to the enterprise network when the user device is determined to have migrated to an unsecured network from the secured enterprise network and instead enforces a new micro-segmentation policy (upon the user device) designed to account for the change in the current location of the user device, and the consequential security related vulnerabilities that could invariably be associated with the change of the current location (of the user device) to an unsecured network, by way of according to the user device, predetermined access control policies exhibiting access privileges pre-programmed to secure (predetermined) enterprise resources forming a part of the secured enterprise network against vulnerabilities arising from access requests emanating from (the) unsecured network and specifically from the user device, which has now migrated from the secured enterprise network to the unsecured network. In addition to never denying access to an enterprise resource, regardless of the current location of the user device requesting such an access (the user device making such a request for access to enterprise resources is also referred to as a 'requesting user device'), the present disclosure envisages categorizing the user device, based on the current location thereof, in terms of the security risks likely to be stemming out from allowing the said user device to access (the) enterprise resources—having considered any network location other than the ones corresponding to the secured enterprise network to be insecure and vulnerable to network security attacks—and enforcing upon the user device micro-segmentation policies embodying access control rules pre-programmed to mitigate such security risks by providing the (requesting) user device with selective and restricted access to the (requested) enterprise resources, as long as the user device is identified to be present in a location other than the ones corresponding to the secured enterprise network.

The computer-implemented method, computer-implemented system, and the computer program product envisaged by the present disclosure also entail the ability to dynamically switch from one micro-segmentation policy to another as soon as the location of the user device is determined to have been changed. In this regard, the micro-segmentation policies embodied in the (computer-implemented) method, system, and computer product of the present disclosure are flexible in terms of access privilege allocation. For instance, when the user device is a part of an unsecured network (for example, a public network), under conventional scenarios, such a user device would be barred from requesting access to any protected entrepreneurial resources. However, as a significant discourse from conventional practice of barring access to enterprise networks and enterprise resources from unsecured locations, the present disclosure envisages providing such a user device with restricted access to (requested) enterprise resources through the enforcement of a micro-segmentation policy pre-programmed with necessary restrictive access privileges, as long as the requesting user device remains at such unsecured, alien locations, and seamlessly switches back to a comparatively permissive access privileges as soon as the user device is found to be within (the perimeter of) the enterprise network. Additionally, while conventional network security schemes do facilitate a blanket ban on enterprise networks and enterprise resources being accessed from unsecured locations outside the enterprise network, the present disclosure envisages regulating, via implementation of predesigned, location-specific micro-segmentation policies, the access to enterprise networks and enterprise resources, as long as the user device (requesting access to the enterprise network and enterprise resources) remains outside the enterprise network, but with the caveat that the trustworthiness of the user device and the user accessing the user device are positively established. For example, a user device registered in the name of the 'enterprise' can be identified via a corresponding 'registration number,' while a user's trustworthiness could be verified by his 'login credentials' inter-alia.

Referring to FIG. 1 of the drawings, there is shown an exemplary schematic describing a broad overview of how the computer-implemented system of the present disclosure is implemented in a typical network environment. As shown in FIG. 1, reference numeral 104 denotes an enterprise network which inter-alia incorporates a first protected server resource 106 and a second protected server resource 108. A virtual private network (VPN) is preferably used to interconnect the enterprise resources, including the first protected server resource 106 and the second protected server resource 108 and render the enterprise resources accessible to end-users. Preferably, a user device 102—also referred to as a 'requesting user device', given the user device 102 frequently requests access to the enterprise network 104 and the incumbent enterprise resources, viz. the first protected server resource 106 and the second protected server resource 108—is configured to, at least, intermittently request access to the enterprise network 104.

In accordance with the present disclosure, in an event the user device 102 connects to the enterprise network 104 via an intranet VPN (not shown in figures), i.e., via a Customer Premise Equipment (CPE) of the enterprise communicably coupled to a specifically provisioned VPN-aware network element, the user device 102 is regarded as a device internal to the enterprise network or as a device located within the enterprise network 104. On the contrary, when the user device 102 connects to enterprise network 104 via a 'remote access VPN', i.e., via a tunnel interconnecting the user device 102 and the VPN-aware network element 110 (also referred to as a VPN endpoint; the reference numeral 110 here onwards used to denote the VPN endpoint) provisioned for the enterprise customer, the user device 102 is termed as a remote user device. When the user device 102 is directly connected to any of the incumbent enterprise resources via the intranet VPN, the user device 102 is categorized as a device local to the enterprise network, and therefore regarded as a 'trustworthy' device present within (and connected directly to) the enterprise network, post successful user and device authentication. Preferably, the process of categorizing the user device 102 as a device internal (local) to the enterprise network 104 or otherwise (i.e., as a remote user device) is undertaken by a policy controller (not shown in FIG. 1) communicably coupled to the user device 102 as well as the enterprise network 104.

In accordance with the present disclosure, subsequent to categorizing the user device 102 as a trustworthy device present within the enterprise network 104 and consequentially as 'local' to the enterprise network 104, the policy controller elicits, preferably from a pre-designated policy database (denoted by reference numeral 304 in FIG. 4), a (at least one) micro-segmentation policy tailor-made for the user device 102 and for the categorization of the user device 102 as the trustworthy device 'local' to the enterprise network 104. Preferably, a micro-segmentation policy enforced on the trustworthy, 'local' user device 102 could allow the user device 102 to access all the tiers (partitions) of both the first protected server resource 106 and the second protected server resource 108. Likewise, while allowing the (trustworthy, local) user device 102 to access all the tiers of the first protected server resource 106 and the second protected server resource 108 (and in turn the whole of the enterprise network 104), the policy controller also enforces tailor-made micro-segmentation policies on the first protected server resource 106 and the second protected server resource 108 respectively to allow outbound communication from the first protected server resource 106 and the second protected server resource 108 to the user device 102. Those ordinarily skilled in the art would appreciate the possibility that the troika of user device 102, first protected server resource 106 and second protected server resource 108 could be controlled via a sole micro-segmentation policy incorporating policy rules relevant to each of the user device 102, first protected server resource 106 and second protected server resource 108. Those ordinarily skilled in the art would also appreciate the possibility of having at least three different micro-segmentation policies respectively controlling the behavior of the user device 102, first protected server resource 106 and second protected server resource 108, with the different policies managed and selectively enforced by the policy controller.

On the contrary, when the user device 102 is determined not to be within the enterprise network 104, but (as) requesting access to the enterprise network 104 via a remote access VPN and consequentially via the VPN endpoint 110, the policy controller categorizes the user device 102 as a device located 'outside' the enterprise network and accordingly labels the user device as untrustworthy—owing to the possibility that the user device 102 could have been accessed by a user exhibiting malicious intent and that the security credentials of (the) user device 102 could not be positively verified, preferably by authentication mechanisms and protocols specific to the enterprise network 104, given that the user device 102 was operating from outside the enterprise network 104 and requesting remote access. However, in a significant recourse from (the conventional phenomenon of) denying access to the user device 102 in consideration of the remote location of the user device 102, the policy controller elicits from the policy database (304) a micro-segmentation policy that not only recognizes the status and the location of the user device 102 as untrustworthy and outside the enterprise network (and therefore remote) respectively, but also confers on the user device 102 certain access privileges, that when implemented do not facilitate a breach of the security and the confidentiality of the information stored in the first protected server resource 106 and the second protected server resource 108, and yet provide the (remote) user device 102 with controlled and selective access to the various tiers (partitions) of both the first protected server resource 106 and the second protected server resource 108 in line with the micro-segmentation policy (elicited by the policy controller) enforceable on the 'remote' user device 102. For instance, given the categorization of the user device 102 as untrustworthy and given that the user device 102 is requesting remote access via a predetermined access point (VPN endpoint 110), the micro-segmentation policy enforced by the policy controller on the 'remote' user device 102 could grant only 'read' privileges for the first protected server resource 106 (while abstaining from granting 'write' and 'modify' privileges) and deny access to the second protected server resource 108 altogether (owing to the fact that the information stored on the second protected server resource 108 is sensitive and therefore cannot be rendered accessible to remote devices whose trustworthiness has not been positively established). Likewise, while allowing the (untrustworthy, remotely located) user device 102 to (only) read from the first protected server resource 106 and denying access to the second protected server resource 108, the policy controller also enforces tailor-made micro-segmentation policies on the first protected server resource 106 and the second protected server resource 108 respectively, firstly to facilitate only reading of information by the 'remote' user device 102 from the first protected server resource 106, and secondly to deny any outbound communication from the second protected server resource 108 to the user device 102. Those ordinarily skilled in the art would appreciate the fact that the micro-segmentation policy or the set of micro-segmentation policies enforceable on the data communication between the 'local' user device 102, first protected server resource 106 and second protected server resource 108 is/are ostensibly different than the micro-segmentation policy or the set of micro-segmentation policies enforceable on the data communication between the 'remote' user device 102, first protected server resource 106 and second protected server resource 108. It will be apparent to those having ordinary skills in the art that the micro-segmentation policy enforceable on the 'local' user device (and by extension the first protected server resource 106 and second protected server resource 108) would ostensibly include access privileges different from the access privileges embodied into the micro-segmentation policy (policies) enforceable on the 'remote' user device 102 and by extension the first protected server resource 106 and second protected server resource 108; with the micro-segmentation policies enforceable on the 'local' user device 102 (and by extension the first protected server resource 106 and second protected server resource 108) being comparatively lenient given the trustworthiness of the 'local' user device 102.

Figure 2A:
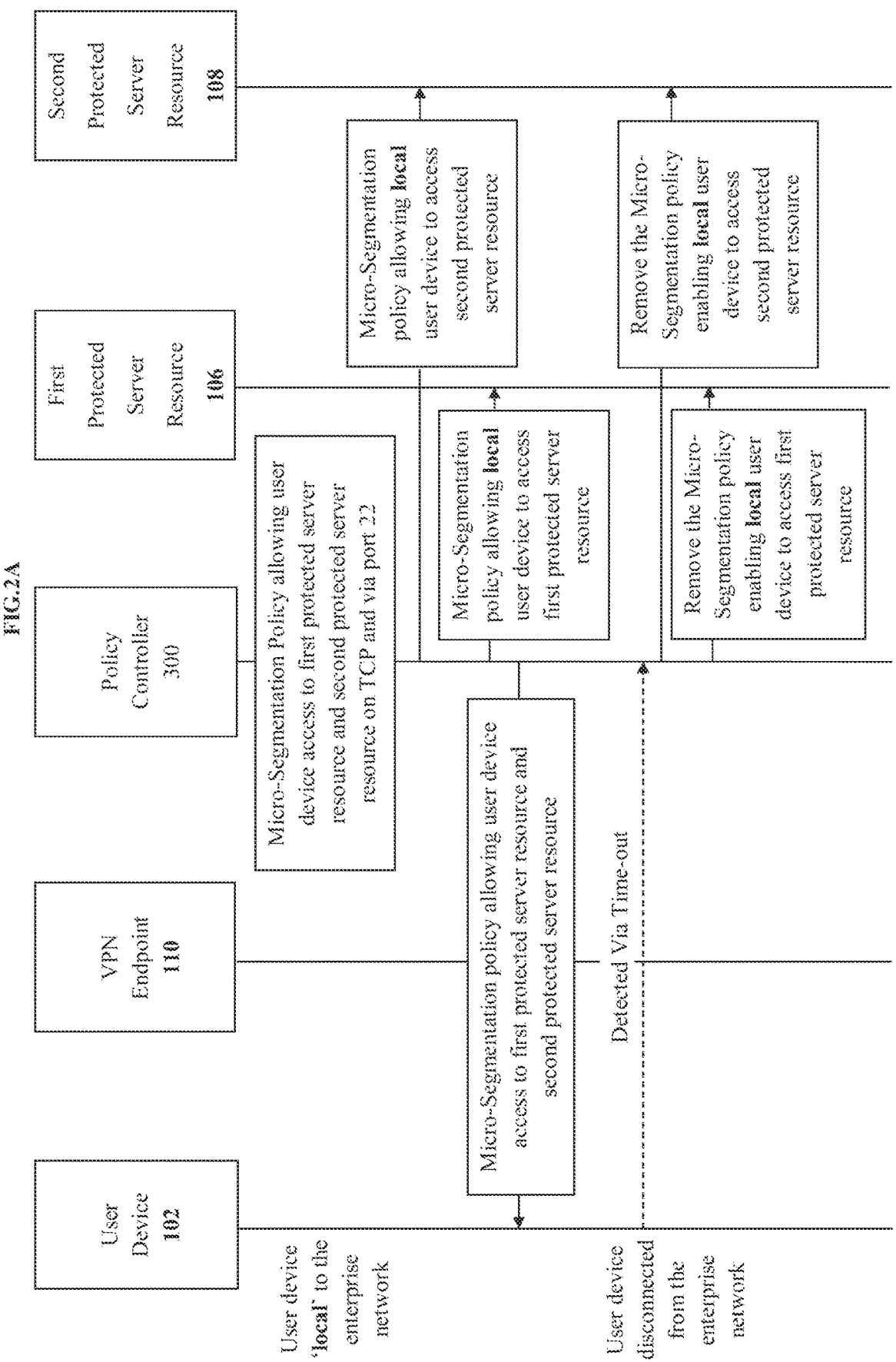
FIG. 2A and FIG. 2B, in combination, describe the chain of events when the user device initially connected directly to the enterprise network moves away to a remote location and attempts to access the enterprise network via a remote access VPN.
Figure 2B:
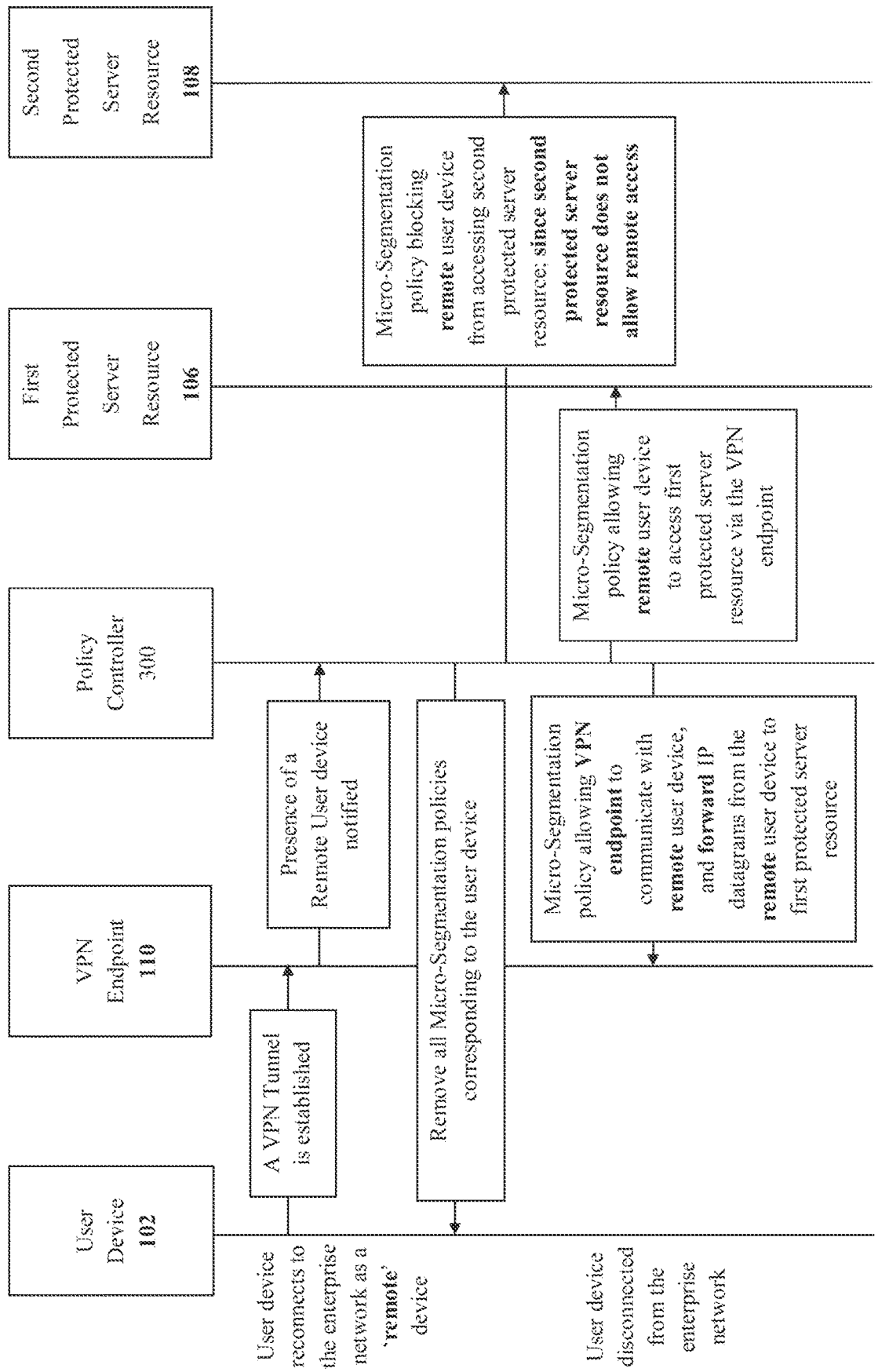

Referring to FIG. 2A and FIG. 2B in combination, there is shown a flow diagram describing the chain of events occurring when the user device 102 which was initially connected directly to the enterprise network 104 (via the intranet VPN) moves away to a remote location and attempts to access the enterprise network 104 via a remote access VPN, i.e., a VPN endpoint. In accordance with the present disclosure, the policy controller 300 (illustrated in FIG. 3) initially conceptualizes at least one micro-segmentation policy enforceable on the user device 102 only when the user device 102 is determined to be connected directly (i.e., via the intranet VPN) to the enterprise network 104. For instance, the micro-segmentation policy, when enforced allows for TCP traffic to be directed from the user device 102 (local to the enterprise network 104) to the first protected server resource 106 and the second protected server resource 108 on Port 22. When the user device 102 is deemed to be connected to the enterprise network 104 via the intranet VPN (thus, when the user device 102 is deemed to be internal to the enterprise network 104), the policy controller 300 pushes the said micro-segmentation policy simultaneously onto the user device 102, the first protected server resource 106 and the second protected server resource 108, and enforces the said micro-segmentation policy thereupon, thereby allowing the user device 102 to transmit outbound TCP traffic to the first protected server resource 106 and the second protected server resource 108 on Port 22, but only as long as the policy controller 300 determines the user device 102 to be internal to the enterprise network 104. Likewise, the micro-segmentation policy conceptualized by the policy controller 300 allows the first protected server resource 106 and the second protected server resource 108 to receive inbound TCP traffic from the user device 102 on Port 22, but with the caveat that the TCP traffic is received on Port 22 only until the user device 102 remains internal to the enterprise network 104. Further, when the user device 102 disconnects from the intranet VPN (and consequentially ceases exhibiting a direct connection to the enterprise network 104), the disconnection of the user device 102 having been ascertained by the policy controller 300 via a timeout detection, the micro-segmentation policy enforceable on the 'local' user device 102, the first protected server resource 106 and the second protected server resource 108 is exterminated, i.e., the micro-segmentation policy is rendered non-enforceable and deleted from the policy database (304).

In accordance with the present disclosure, when the user device reconnects to the enterprise network 104 via remote access VPN and consequentially via a predesignated proxy device (i.e., VPN endpoint 110), the policy controller, having tracked the behavior and actions of the user device 102, categorizes the user device 102 as a 'remote' user device (102). Subsequent to the categorization of the user device 102 as the 'remote' user device, a dedicated, encrypted tunnel is established, at least temporarily, between the user device 102 and the predesignated VPN endpoint 110. The policy controller (denoted by reference numeral 300 in FIG. 3) subsequently conceptualizes another micro-segmentation policy—ostensibly different from the micro-segmentation policy enforced on the 'local' user device 102—enforceable specifically (and only) on the 'remote' user device 102.

The newly conceptualized micro-segmentation policy is rendered strictly enforceable on the predesignated VPN endpoint 110 and consequentially on the (remote) user device 102 only when the user device 102 is located 'outside' the enterprise network 104 and is connected to the enterprise network 104 via the predesignated VPN endpoint 110. The newly conceptualized micro-segmentation policy, for example, allows the (remote) user device 102 to access (and communicate with) the first protected server resource 106 via the VPN endpoint 110 and on Port 22; with the newly conceptualized micro-segmentation policy allowing the user device 102 to communicate with the predesignated VPN endpoint 110, and the predesignated VPN endpoint 110 to communicate with the first protected server resource 106 (on behalf of the 'remote' user device 102) on Port 22.

Further, preferably, the second protected server resource 108 is considered as storing information both sensitive and confidential and is therefore rendered inaccessible to any device located outside the enterprise network 104. The policy controller, while conceptualizing the new micro-segmentation policy applicable (only) to the VPN endpoint 110 and consequentially the 'remote' user device 102, takes into account the sensitivity associated with the information stored in the second protected server resource 108 and therefore enforces the new micro-segmentation policy on the VPN endpoint 110 and the 'remote' user device 102 such that the 'remote' user device 102 is prohibited from accessing the second protected server resource 108 via the said predesignated VPN endpoint 110, all the while restricting the 'remote' user device 102 to transmitting outbound TCP traffic on Port 22 only to the first protected server resource 106, via the said predesignated VPN endpoint 110, at least until the policy controller determines the (remote) user device 102 to be connected to the enterprise network 104 via the remote access VPN and consequentially via the (predesignated) VPN endpoint 110. Likewise, the newly conceptualized micro-segmentation policy allows only the first protected server resource 106 to receive inbound TCP traffic from the user device 102 on Port 22, and prevents the second protected server resource 108 from receiving any inbound traffic from the 'remote' user device 102 (via the said predesignated VPN endpoint 110) as long as the 'remote' user device 102 is determined, by the policy controller, as utilizing the VPN endpoint 110 as a 'proxy' for communicating with the enterprise network 104.

In accordance with the present disclosure, the (exemplary) micro-segmentation policy rendered enforceable on the first protected resource 106 for allowing 'inbound' TCP traffic from the 'remote' user device 102 on Port 22, and for that matter, all the micro-segmentation policies envisaged by the present disclosure are rendered agnostic to network address translation (NAT). Preferably, the VPN endpoint that functions as a proxy to the 'remote' user device 102 and enables the 'remote' user device 102 to communicate and exchange data packets (TCP traffic) with the first protected resource—in line with the micro-segmentation policy conceptualized by the policy controller for the 'remote' user device 102—is communicably coupled to the VPN endpoint via an encrypted tunnel, which is dynamically instantiated when the 'remote' user device requests access to the enterprise network 104 via the said predesignated VPN endpoint. Preferably, the encrypted tunnel—interconnecting the 'remote' user device 102 and the VPN endpoint—receives the outbound TCP traffic from the 'remote' user device 102 and redirects the said TCP traffic to the VPN endpoint. In line with the micro-segmentation policy conceptualized by the policy controller for the 'remote' user device 102. Preferably, the VPN endpoint is communicably coupled to a pre-configured NAT-aware enterprise gateway which in turn is configured to replace the source IP address (and preferably the source port number) embedded within each of the data packets (TCP traffic) transmitted from the VPN endpoint (and inbound to the first protected server resource 106) with a 'translated IP address' and a 'translated port number'—the translated IP address and translated port number selected from a pool of internal IP addresses and internal port numbers pre-assigned to the (NAT-aware) enterprise gateway. The enterprise gateway, subsequent to the translation of the data packets (TCP traffic) outbound from the VPN endpoint, transmits the translated data packets to the first protected server resource 106 in line with the micro-segmentation policy conceptualized for the 'remote' user device 102.

In accordance with the present disclosure, the translation of the data packets at the NAT-aware enterprise gateway (not shown in figures) nullifies the effect of any Network Address Translation (NAT) previously performed upon the data packets (TCP traffic) by internet service provider (ISP) networks. Typically, the TCP traffic (data packets) outbound from the 'remote' user device 102 are translated by, for example, an IP Service Switch (IPSS) when the TCP traffic is transmitted from the 'remote' user device 102 to a predesignated enterprise VPN gateway (in this case the VPN endpoint or the proxy device) on an encrypted tunnel overlaying the Internet Service Provider network (connected to the 'remote' user device 102). However, when the data packets (TCP traffic) arrive at the VPN endpoint (enterprise VPN gateway) across the encrypted tunnel, the application data incorporated within the packet headers of the data packets point to—by virtue of the NAT at the IPSS—the translated source IP addresses and the translated source port numbers instead of the original source IP addresses and the original source port numbers. However, in the present case, since the policy controller is not informed before the creation of the micro-segmentation policy corresponding to the 'remote' user device 102 about the network address translation and the consequential translated source IP addresses and the translated source port numbers, the policy controller, at least in this case, fails to account for the translated source IP addresses and the translated source port numbers in the micro-segmentation policy enforceable (to be enforced) on the 'remote' user device 102. The induced inability on the part of the policy controller to account for the translated source IP addresses and the translated source port numbers in the micro-segmentation policy enforceable (to be enforced) on the 'remote' user device 102 could typically metamorphosize into a policy error which could, in turn, render the micro-segmentation policies non-enforceable on TCP traffic incorporating translated data packets (outbound from the 'remote' user device). Therefore, in order to preclude the aforementioned phenomenon and to consequentially negate the induced inability of the policy controller in terms of conceptualizing micro-segmentation policies responsive to and relevant to translated source IP addresses and translated source port numbers, the enterprise gateway (VPN endpoint/proxy device) envisaged by the present disclosure is configured to entail a NAT-aware mechanism and to (re)translate every data packet outbound from the 'remote' user device and consequentially replace the translated source IP address and translated source port number embedded within every such data packet with a corresponding internal source IP address and internal source port number—the internal source IP address and internal source port number preassigned to the enterprise gateway—such that the data packets outbound from the 'remote' user device (and inbound to the enterprise gateway) are uniquely identified at the enterprise gateway, thereby enabling the policy controller to integrate the internal source IP address and internal source port number preassigned to the enterprise gateway into the micro-segmentation policies enforceable on 'remote' user device 102 so that the said micro-segmentation policy can be appropriately enforced on every data packet received and translated by the enterprise gateway notwithstanding of the network address translation previously performed upon the data packets outbound from the 'remote' user device 102 by the IPSS.

Figure 3:
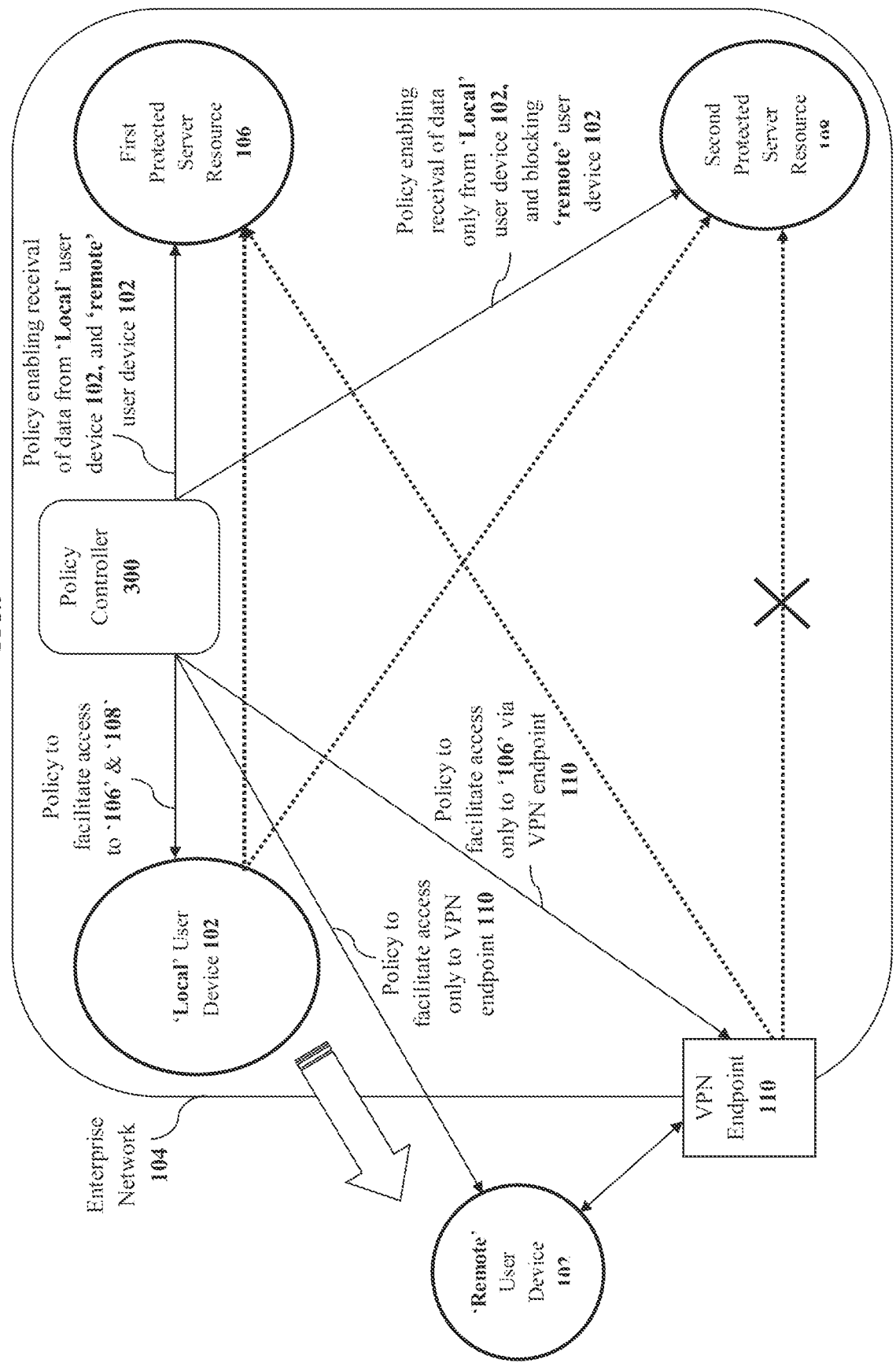
FIG. 3 is a flow diagram describing the migration of the user device from within the enterprise network 104 to outside the enterprise network 104 and consequentially to a 'remote' location not a part of the enterprise network.

Referring to FIG. 3, there is shown a flow diagram describing the migration of the user device 102 from within the enterprise network 104 to outside the enterprise network 104 and consequentially to a 'remote' location not a part of the enterprise network. As described in FIG. 3 and reiterated earlier, when the policy controller 300 determines that the user device 102 is connected to the enterprise network 104 via (an) intranet VPN, the micro-segmentation policies governing the data communication outbound from the user device 102 and directed (inbound) to the first protected server resource 106 and the second protected server resource 108 are pushed directly onto the user device 102 since the user device 102 is directly connected to the enterprise network 104. On the contrary, if the policy controller 300 determines that the user device 102 is attempting a remote access to the enterprise network 104 and consequentially to the incumbent first protected server resource 106 and the second protected server resource 108, then the policy controller 300 firstly categorizes the user device 102 as a 'remote' user device (102), and pushes a different set of micro-segmentation policies (also referred to as a forwarding policy)—a set of micro-segmentation policies ostensibly different from micro-segmentation policies previously enforced upon the user device 102 when the user device 102 was determined to be 'internal' to the enterprise network—governing the data communication outbound from the user device 102 and directed (inbound) to the first protected server resource 106 and the second protected server resource 108, onto the (pre-designated and pre-configured) VPN endpoint 110—instead of the 'remote' user device 102—through which the data traffic emanating from the 'remote' user device 102 is designated to be (re)directed to the enterprise network 104 (and in turn to the first protected server resource 106 and the second protected server resource 108) in line with the forwarding policy.

Figure 4:
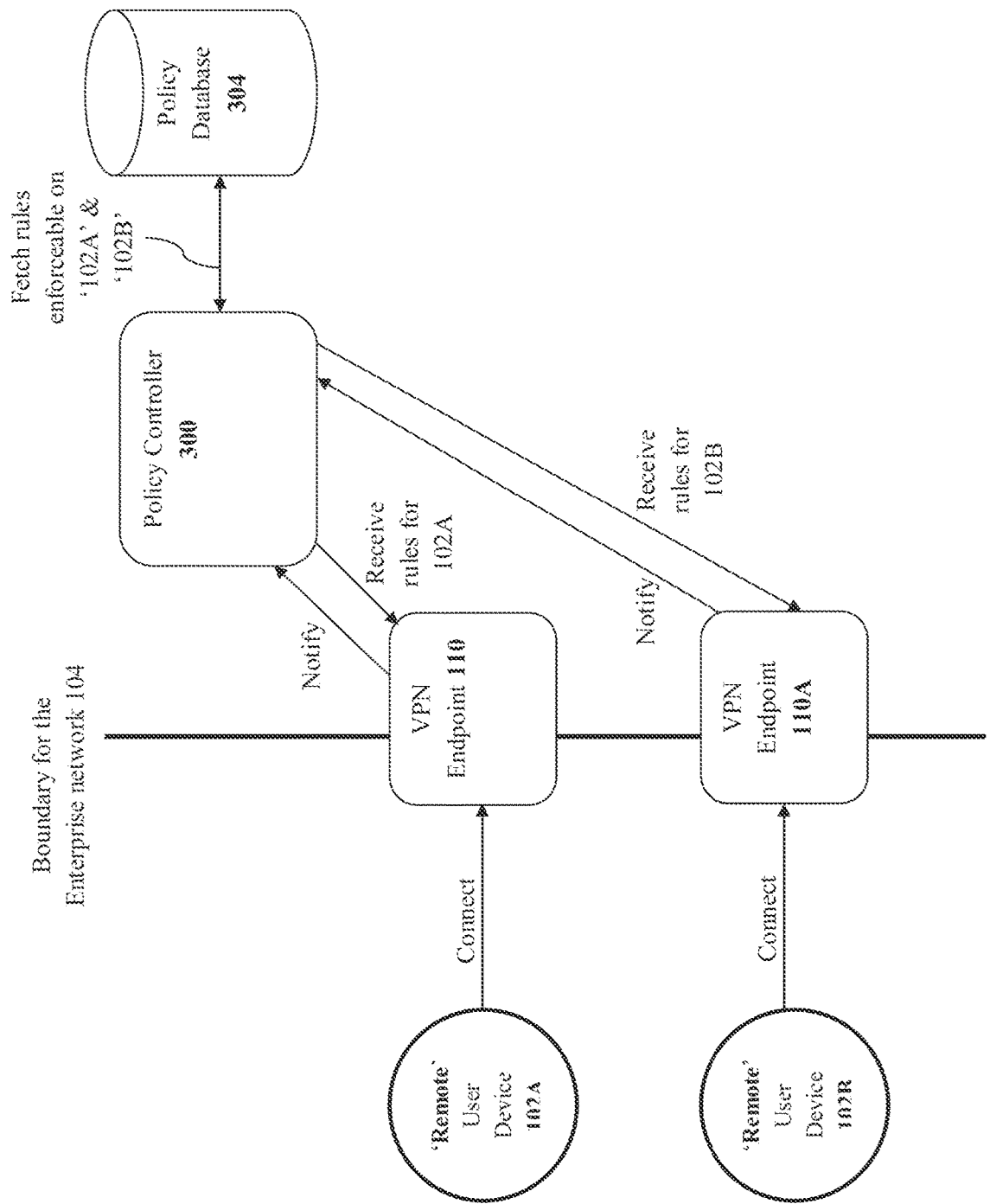
FIG. 4 is a flow diagram describing the interaction between the policy controller, the remote user device, and the remote user device.

Referring to FIG. 4, there is shown a flow diagram describing the interaction between the policy controller 300, remote user device 102A, and remote user device 102B. As described in FIG. 4, the remote user device 102 attempts a remote access on the enterprise network 104 (and in turn the first protected server resource 106 and the second protected server resource 108 constituted as at least a part of the enterprise network 104) via the VPN endpoint 110, whereas the remote user device 102B attempts a remote access on the enterprise network 104 (and in turn the first protected server resource 106 and the second protected server resource 108) via a VPN endpoint 110A. The policy controller 300, in accordance with the present disclosure, is communicably coupled to the VPN endpoints 110 and 110A, remote user device 102A and remote user device 102B. The policy controller 300 is pre-programmed to distinguish between the micro-segmentation policies applicable to the remote user device 102A and remote user device 102B.

Preferably, the policy controller 300 is pre-programmed to incorporate (and subsequently enforce) access control policies, preferably micro-segmentation policies, specifying, inter-alia, the privileges/rights/credentials necessary to access and communicate with enterprise resources (in this case, the first protected resource 106 and the second protected resource 108 are designated as enterprise resources) and the configuration requirements necessary to be embodied within the user devices requesting access to enterprise resources, in order to render the requesting user devices eligible for accessing the enterprise resources. Consequentially, when any of the user devices, i.e., the user device 102A and the user device 102B, request an access to (any of the) enterprise resources (in this case, the first protected server resource 106 and the second protected server resource 108), the policy controller 300, based at least on the access request generated by the user devices, identifies a set of the micro-segmentation policies enforceable to the user device 102A and the user device 102B.

Preferably, the policy controller 300, on receiving access requests from user device 102A and user device 102B, firstly analyses the privileges assigned onto the 'requesting' user devices 102A and 102B, the user credentials and user roles currently associated with the 'requesting' user devices 102A and 102B, and the configuration requirements corresponding to the 'requesting' user devices 102A and 102B. Subsequently, the policy controller 300 analyses the respective sets of micro-segmentation policies (stored in the policy database 304) governing access to the first protected server resource 106 and the second protected server resource 108, followed by a comparison between the privileges, user credentials, user roles and configuration requirements associated with the 'requesting' user devices 102A and 102B, and the (sets of) micro-segmentation policies governing access to the first protected server resource 106 and the second protected server resource 108 respectively, to determine whether the user devices 102A and 102B are allowed to access the first protected server resource 106 and the second protected server resource 108.

In an exemplary scenario, the first protected server resource 106 is configured, preferably by a pre-programmed micro-segmentation policy to allow user devices which are connected only via an intranet VPN and associated with the user role 'administrator.' And the second protected server resource 108 is pre-programmed by yet another micro-segmentation policy to allow access to user devices connected via intranet VPN as well as remote access VPN, and associated with only 'write & delete' access permissions. In accordance with the exemplary scenario, the user device 102A is connected to the enterprise network 104 via an intranet VPN and is accessed by a user having logged-in as an administrator. In this case, the user 102A (having been) connected to the enterprise network 104 via an intranet VPN and accessed by a user having 'administrator' privileges satisfies both the preconditions stipulated by both the micro-segmentation policies governing access to first protected server resource 106 and second protected server resource 108 respectively. And therefore the user device 102A is allowed to access both the first protected server resource 106 and second protected server resource 108 in line with the corresponding micro-segmentation policies. However, as soon as the user device 102A switches over to a remote access VPN (from the intranet VPN), the policy controller 300, preferably simultaneously, ascertains that the user device 102A no longer satisfies one of the criteria—i.e., to be connected to the enterprise network 104 only via an intranet VPN—and therefore triggers the first protected server resource 106, regardless of the fact that the user of the user device 102A still possesses 'administrator' privileges, to deny access to user device 102 in line with the micro-segmentation policy governing access to the first protected server resource 106, until the user device 102A switches back to the intranet VPN. However, the user device 102A is provided with continued access to the second protected resource 108 since the micro-segmentation policy governing access to the second protected resource 108 permits network connections via both intranet VPN and remote access VPN, and provides access to (any) user with 'write & delete' access permissions; the 'write & delete' assigned by default to a user having 'administrator' privileges.

In accordance with the aforementioned exemplary scenario, the user device 102B is connected to the enterprise network 104 via an intranet VPN and is accessed by a user having been assigned the role of a 'subscriber' and granted only 'read' access permission. In this case, the user device 102B is denied access to the first protected server resource 106 since the micro-segmentation policy governing access to the first protected server resource 106 allows access only to users having 'administrator' privileges, but the current user of the user device 102B is assigned the role 'subscriber', notwithstanding that the user device 102B is connected to the enterprise network via an intranet VPN. Secondly, the user device 102B is denied access to the second protected server resource 108 as well, since the micro-segmentation policy governing access to the second protected server resource 108 allows no user other than the ones having been assigned 'write & delete' access privileges, notwithstanding that the user device 102B is connected to the enterprise network 104 via either an intranet VPN or a remote access VPN; both modes of network connection being allowed by the micro-segmentation policy governing access to the second protected server resource 108. However, in accordance with the present disclosure, the policy controller 300 continually tracks the characteristics and the behavior of the user device 102B (in addition to that of the user device 102 and any other user miscellaneous user devices requesting access to the enterprise network 104), and enables, in this case, the user device 102B to access the first protected server resource 106 as soon as the user device 102B is determined (by the policy controller 300) to be associated with a user having 'administrator' privileges. Likewise, the policy controller 300 enables the user device 102B to access the first protected server resource 108 as soon as the policy controller 300 determines that the user device 102B is accessed by a user having 'write & delete' access permissions.

Further, as described earlier, the second protected server resource 108 is pre-programmed—ostensibly by a micro-segmentation policy different than the one enforced upon the first protected server resource 106—to allow access to user devices connected via an intranet VPN as well as a remote access VPN, and incorporating only 'write & delete' access permissions. And when the user device 102B is determined to be connected to the enterprise network 104 via a remote access VPN and consequentially via the VPN endpoint 110, and (further determined to be) rendered accessible to a user having been assigned the role of a 'subscriber' and granted only a 'read' access permission, the user device 102B is denied access, firstly, to the first protected server resource 106 since access to the first protected server resource 106 is governed by a micro-segmentation policy that allows access only to the (user) devices connected to enterprise network 104 via an intranet VPN. Secondly, as soon as the policy controller 300 determines that the user device 102B is connected to the enterprise network 104 via the VPN endpoint 110, the policy controller 300 designates the user device 102 as a 'remote user device', and subsequently enforces the micro-segmentation policy (governing access to the second protected server resource 108) on the VPN endpoint 110—instead of the user device 102B, as was the case, typically—thereby prohibiting the VPN endpoint 110 from communicating with the second protected resource 108 and consequentially blocking the user device 102B—which is connected to the VPN endpoint 110—from communicating with (accessing) the second protected server resource 108. On the contrary, in the event the policy controller 300 determines the user device 102B, while connected to the enterprise network 104 via the VPN endpoint 110, is accessed by a user entrusted with 'write & delete' access permissions, then the policy controller 300—while still blocking the user device 102B from accessing the first protected server resource 104, since the user device 102B is still connected to the enterprise network 104 via the VPN endpoint 110 instead of an intranet VPN, as mandated by the micro-segmentation policy governing access to the first micro-segmentation policy—subsequently reconfigures the micro-segmentation policy governing access to the second protected server resource 108, and subsequently enforces the reconfigured micro-segmentation policy on the VPN endpoint 110 such that the VPN endpoint 110 is enabled to direct the TCP traffic received from the user device 102B to the second protected server resource 108, and subsequently redirect any (responsive) TCP traffic from the second protected server resource 108 back to the user device 102B, thereby facilitating data communication (and possible information exchange) between the (remote) user device 102 and the second protected server resource 108 via the VPN endpoint 110.

Figure 5A:
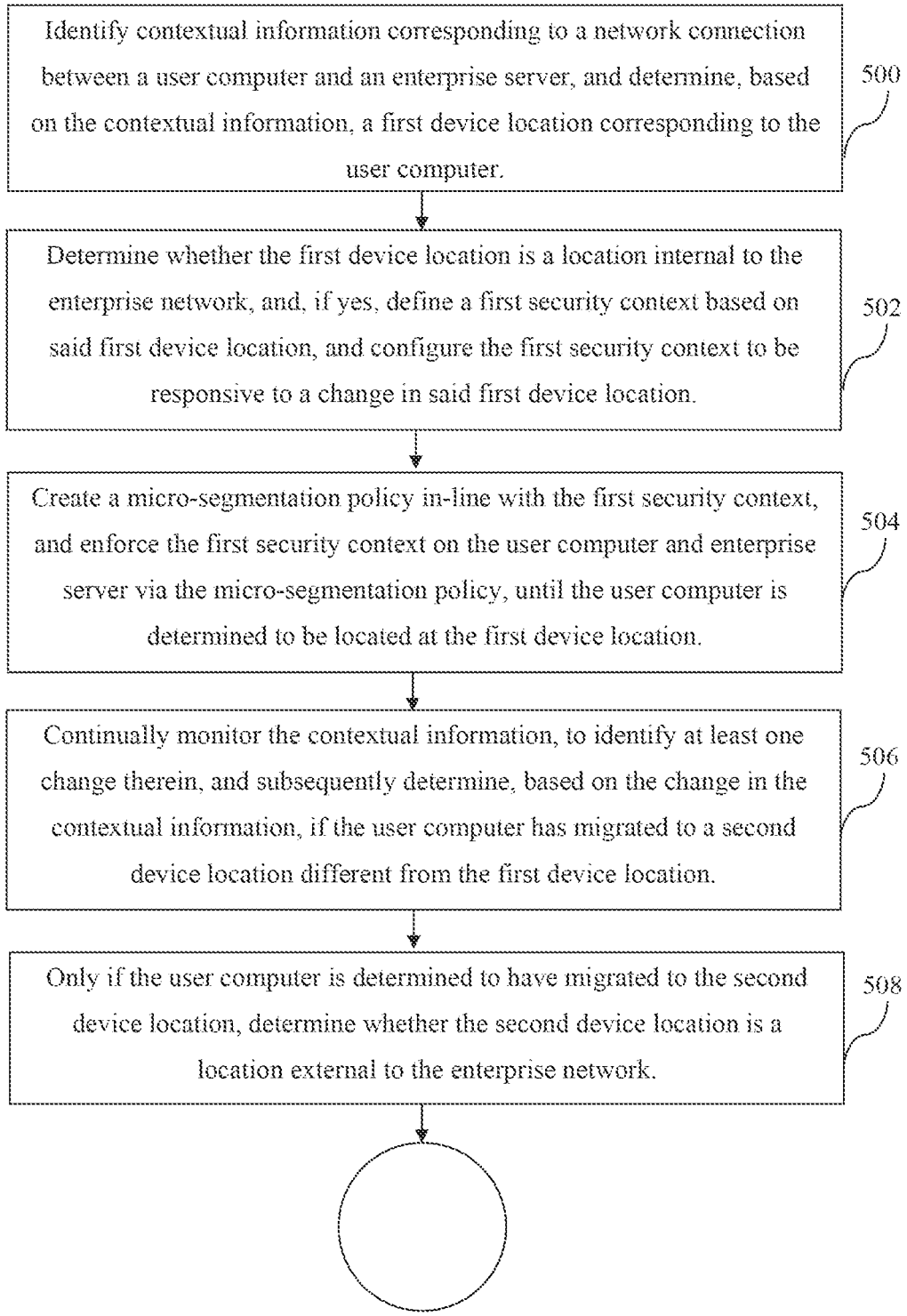
FIG. 5A and FIG. 5B, in combination, illustrate a flowchart describing the steps involved in the computer-implemented method for creating and enforcing at least one contextual micro-segmentation policy on a user computer communicably connected to an enterprise server via a pre-established, secured enterprise network.
Figure 5B:
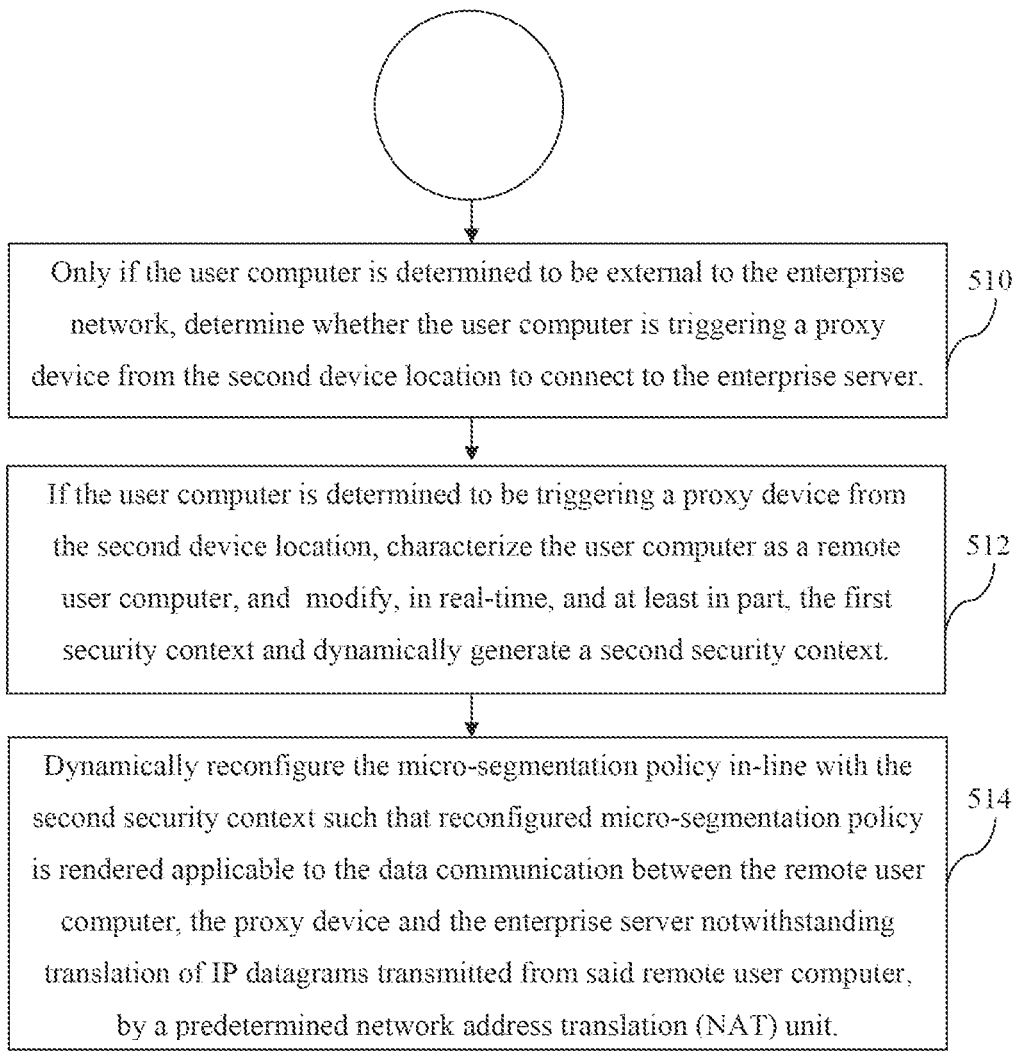

Referring to FIG. 5A and FIG. 5B in combination, there is shown a flowchart illustrating the steps involved in the computer-implemented method for creating and enforcing at least one contextual micro-segmentation policy on a user computer communicably connected to an enterprise server via a pre-established, secured enterprise network. The execution of the method begins at step 500 where the contextual information corresponding to a network connection established between the user computer (hereafter user device) and enterprise server (hereafter the enterprise server is identified as a combination of first protected server resource and second protected server resource) via a pre-established, secured enterprise network, is determined. The location information corresponding to the user device is preferably the information indicative of at least the current location of the user device.

At step 502—the said step executed in entirety by a policy controller (not shown in figures)—the contextual information corresponding to the user device is analyzed (preferably by a policy controller) and a security context is associated with the user device directly and solely depending upon the current location of the user device. In accordance with the present disclosure, in an event the user device connects to the enterprise network via an intranet VPN (not shown in figures), i.e., via a Customer Premise Equipment (CPE) of an enterprise communicably coupled to a specifically provisioned VPN-aware network element, the user device is regarded as a device internal to the enterprise network or as a device located within the enterprise network. And, on the contrary, when the user device connects to the enterprise network via a 'remote access VPN,' i.e., via a tunnel interconnecting the user device and a VPN-aware network element (VPN endpoint) provisioned for the enterprise customer, the user device is termed as a remote user device. When the user device is directly connected to any of the incumbent enterprise resources via the intranet VPN, the user device is categorized as a device local to the enterprise network, and therefore regarded as a 'trustworthy' device present within (and connected directly) to the enterprise network, post successful user and device authentication. To conclude, at step 502, if the user device is determined to be 'internal/local' to the enterprise network, a first security context is created and consequentially associated exclusively with the (local) user device, and the first security context is rendered responsive to any change in the device location (that in turn dictates the security context associated with the user device).

At step 504—said step also executed in entirety by the policy controller—at least one micro-segmentation policy is created in-line with the first security context associated with the user device. Alternatively, a micro-segmentation policy suiting the first security context associated with the user device could be elicited from a pre-designated policy store, although the method envisaged by the present disclosure prefers the former approach given the dynamicity associated therewith. In accordance with the present disclosure, preferably, the micro-segmentation policy enforced on the trustworthy, 'local' user device could allow the user device to access, via the transmission of IP datagrams/TCP traffic, all the tiers (partitions) of both the first protected server resource and the second protected server resource. Likewise, while allowing the (trustworthy, local) user device to access all the tiers of the first protected server resource and the second protected server resource (and in turn the whole of the enterprise network), the policy controller also enforces tailor-made micro-segmentation policies on the first protected server resource and the second protected server resource respectively to allow outbound communication (transmission of IP datagrams/TCP traffic) from the first protected server resource and the second protected server resource to the user device. However, the micro-segmentation policies described above are enforced on the user device and the first protected server resource and the second protected server resource only until the user device is determined to be 'local/internal' to the enterprise network.

At step 506—the said step again executed in entirety by the policy controller—the contextual information, in turn, indicating the current location of the user device is continually monitored and any change in the contextual information associated with the user device, and in turn the current location of the user device, is duly noted and analysed. And at step 508, only in an event a change in the contextual information is detected, the policy controller determines whether the user device has migrated from a (first) location 'local/internal' to the enterprise network (discussed in steps 500 and 502) to a (second) location 'remote/external' to the enterprise network. And at step 510, only in an event the user device is determined to be present at a location 'external/remote' to the enterprise network, the policy controller determines whether the user device is attempting to connect to the first server resource and the second protected server resource via a remote access VPN and consequentially via a predesignated VPN endpoint (a device acting as a 'proxy' for the user device).

Further, at step 512, subsequent to determining that the user device has migrated from a location 'locaLinternal' to the enterprise network to a location 'remote/external' to the enterprise network, the policy controller categorizes/designates the user device as a 'remote' user device. Subsequently, the policy controller modifies, preferably dynamically and in real-time, the first security context previously associated with the user device when the said user device was determined to be 'local/internal' to the enterprise network, and generates a second security context which in turn is consistent with the migration of the user device to a location 'remote/external' to the enterprise network, and the (new) categorization of the user device as the 'remote' user device.

Subsequently, at step 514, the micro-segmentation policy (previously) enforced upon the user device when the user device was determined to be 'local' to the enterprise network, is dynamically reconfigured. Alternatively, a micro-segmentation policy suiting the second security context associated with the user device and suiting the categorization of the user device as a 'remote' user device could be elicited from a pre-designated policy store, and pushed onto the 'remote' user device, the first protected server resource and the second protected server resource as a replacement for the previously enforced micro-segmentation policy. Preferably, when the user device is determined not to be within the enterprise network, but (as) requesting access to the enterprise network via a remote access VPN and consequentially via a predetermined VPN endpoint, the policy controller enforces a new micro-segmentation policy—which is ostensibly different from the micro-segmentation policy enforced on the 'local' user device and by extension on the first protected server resource, and the second protected server resource—that not only recognizes the change from the first security context to the second security context, but also the consequential change in the status and the location of the user device as untrustworthy and outside the enterprise network (and therefore remote) respectively, and accordingly confers on the (remote) user device and the VPN endpoint (communicably coupled to the 'remote' user device) certain access privileges that when implemented provide the (remote) user device with controlled and selective access to the various tiers (partitions) of both the first protected server resource and the second protected server resource in line with the new micro-segmentation policy, as opposed to the unrestricted access (discussed in step 504) provided to the user device when the user device was regarded as being 'local' to the enterprise network. A noteworthy difference in this case vis-à-vis the implementation of the step 504 is that the new micro-segmentation policy conceptualized in line with the second security context is enforceable not only on the 'remote' user device but also on the VPN endpoint which functions as a proxy to the 'remote' user device and redirects the IP datagrams/TCP traffic received from the 'remote' user device to the first protected server resource and the second protected server resource.

Further, for instance, given the categorization of the user device as untrustworthy and given that the user device is requesting remote access via a predetermined access point (VPN endpoint), the new micro-segmentation policy enforced on the 'remote' user device could grant only 'read' privileges for the first protected server resource (while abstaining from granting 'write' and 'modify' privileges) and deny access to the second protected server resource altogether (owing to the fact that the information stored on the second protected server resource is sensitive and therefore cannot be rendered accessible to remote devices whose trustworthiness has not been positively established). Likewise, while allowing the (untrustworthy, remotely located) user device to (only) read from the first protected server resource and denying access to the second protected server resource, the policy controller also enforces tailor-made micro-segmentation policies on the first protected server resource and the second protected server resource respectively, firstly to facilitate only reading of information by the 'remote' user device from the first protected server resource, and secondly to deny any outbound communication from the second protected server resource to the user device.

Technical Advantages

The technical advantages envisaged by the present disclosure include the realization of a network security scheme specifically configured to seamlessly and dynamically switch between a plurality of (pre-configured) micro-segmentation policies in-line with the change in the location of the user to which the micro-segmentation policies are to be applied. Additionally, the present disclosure provides for different micro-segmentation policies embodying different access permissions to be seamlessly implemented on a user device in line with any dynamic changes in the location of the user device; with the (current) location of the user device used as an indicator of the trustworthiness of the user device and as a cue for enforcing micro-segmentation policies whose relevance and applicability to the user device is (dynamically) determined solely based on the current location of the user device. Further, the present disclosure allows for the current location of the user device to be used as the sole indicator of the trustworthiness thereof, and thereby responds to the possibility of user device being trustworthy or otherwise, with different micro-segmentation policies which accord differential access permissions to the user device in-line with the current location and the consequential trustworthiness of the user device. The network security scheme envisaged by the present disclosure categorizes a user device as trustworthy only if the user device is determined to be within the perimeter of the enterprise network. On the contrary, any user device either requesting access to the enterprise network or connected to the enterprise network via a VPN is regarded as vulnerable for misuse and consequentially untrustworthy. The network security scheme envisaged by the present disclosure covers the possibility of a genuine, trustworthy user requesting access to the enterprise network via a user device connected to a VPN endpoint (instead of the enterprise network), while simultaneously abstaining from denying access outright to the user device, by creating forwarding policies—micro-segmentation policies applicable only to VPN endpoints through which the enterprise network is rendered accessible to the user device—specifically preconfigured to identify genuine users and trustworthy user devices accessible to such genuine users, and consequentially provide genuine users and corresponding trustworthy user devices with at least selective access to the enterprise network and in turn the constituent enterprise resources.

The network security scheme envisaged by the present disclosure binds, at least theoretically, each of the VPN endpoints eligible to connect to the enterprise network, with specific user devices accessible to specific users, such that forwarding policies are preconfigured to allow predetermined (genuine) users having access to predetermined (trustworthy) user devices to connect to the enterprise network and consequentially access (pre) selected enterprise resources. Additionally, the network security scheme envisaged by the present disclosure also provides for the forwarding policies to be revised and the associated access permissions modified, subject to a revaluation of the trustworthiness associated with the user device (requesting access to the enterprise network via the VPN endpoint). Further, the network security scheme envisaged by the present disclosure, by rendering specific, predesignated forwarding policies applicable to individual VPN endpoints, overcomes the drawbacks associated with conventional VPN specific authentication mechanisms, which despite its advantages remained vulnerable and consequentially susceptible to a data breach. The forwarding policies envisaged by the present disclosure not only augment the conventional VPN specific authentication mechanism but also identify and restrict unauthorized access attempts to the boundary of a (the) VPN, i.e., VPN endpoints, by applying, at every VPN endpoint, a corresponding specific forwarding policy preconfigured to identify genuine users and corresponding trustworthy user devices, and to provide only the said genuine users and (corresponding) trustworthy user devices with selective access to enterprise resources, in line with the access permissions prescribed by the (corresponding) forwarding policy. Further, the network security scheme envisaged by the present disclosure does not necessitate an enterprise firewall—which is preferably implemented on an enterprise server to control access to the enterprise network and in turn the enterprise resources—to be reconfigured to accommodate 'external IP addresses' of user devices requesting access to the enterprise network in order to expose the said user devices to the firewall rules/policies prescribed by the enterprise firewall, and instead exposes every user device (requesting access to the enterprise network) to micro-segmentation policies created based at least on the location of the user device, rendered sensitive to any changes in the current location of the user devices, and preconfigured to provide (requesting) user devices with selective and secured access to the enterprise network and in turn the constituent network resources, taking into consideration the current location of the user device serving as a sole benchmark for determining the trustworthiness thereof. Additionally, the network security scheme envisaged by the present disclosure, instead of necessitating a reconfiguration of the enterprise firewall, exposes each of the VPN endpoints communicably coupling the enterprise network with user devices to preconfigured forwarding policies which in turn theoretically bind the VPN endpoints with specific (trustworthy) user devices accessible to specific (genuine) users, and allow only said specific user devices and users to connect to the enterprise network and consequentially access (pre) selected enterprise resources.

What is claimed is:

1. A computer-implemented method for creating and enforcing at least one contextual micro-segmentation policy on a user computer communicably connected to an enterprise server via a pre-established, secured enterprise network, said method comprising the following computer-implemented steps:

identifying contextual information corresponding to a network connection established between said user computer and said enterprise server via said pre-established, secured enterprise network, and determining, based on said contextual information, at least a first device location corresponding to said user computer;

determining, based on said contextual information, whether said first device location is a location internal to said enterprise network, and only in an event said first device location is a location internal to said enterprise network, defining a first security context based on said first device location, and configuring said first security context to be responsive to a change in said first device location;

creating said at least one micro-segmentation policy in-line with said first security context, and configuring said at least one micro-segmentation policy to enforce said first security context on said user computer and said enterprise server, only as long as said user computer is determined to be located at said first device location, and selectively facilitating transmission of IP datagrams between said user computer and said enterprise server, in-line with said first security context and said at least one micro-segmentation policy;

continually monitoring said contextual information corresponding to said network connection, to identify at least one change in said contextual information, and determining, based on said at least one change in said contextual information, whether said user computer has migrated to a second device location different from said first device location;

only in an event said user computer is determined to have migrated to said second device location, determining whether said second device location is a location external to said enterprise network;

only in an event said user computer is determined to be external to said enterprise network, determining whether said user computer is triggering a proxy device from said second device location to connect to said enterprise server;

in response to determining that said user computer is triggering a proxy device from said second device location to connect to said enterprise server, characterizing said user computer as a remote user computer, and modifying, in real-time, and at least in part, said first security context and dynamically generating a second security context, said second security context consistent with migration of said user computer from said first device location to said second device location, and consequentially from within said enterprise network to outside said enterprise network, and with characterization of said user computer as said remote user computer; and dynamically reconfiguring said micro-segmentation policy in-line with said second security context, such that reconfigured micro-segmentation policy is enforced on said proxy device and is rendered applicable to said IP datagrams transmitted from said remote user computer to said enterprise server via said proxy device, to facilitate selective transmission of said IP datagrams between said remote user computer and said enterprise server via said proxy device, and wherein each of said IP datagrams is translated by a predetermined IP services switch (IPSS) and embedded with a translated source IP address and a translated source port number;

and wherein said method further includes the steps of:

embedding within said reconfigured micro-segmentation policy, an internal source IP address and an internal source port number preassigned to an enterprise gateway communicably coupled to said enterprise server; and configuring said enterprise gateway to replace said translated source IP address and said translated source port number assigned to said IP datagrams with said internal source IP address and said internal source port number, thereby nullifying a network address translation (NAT) previously performed on each of said IP datagrams by said IP services switch (IPSS) and rendering each of said IP datagrams uniquely identifiable at said enterprise gateway, based on said internal source IP address and said internal source port number, and further rendering said reconfigured micro-segmentation policy enforceable on each of said IP datagrams, based on said internal source IP address and said internal source port number.

2. The method as claimed in claim 1, wherein the step of determining, based on said contextual information, at least a first device location corresponding to said user computer, further includes the followings steps:

identifying whether said user computer is connected to said enterprise server via at least one of a Local Area Network (LAN), Wide Area Network (WAN) and Intranet;

identifying said first device location as a location within said enterprise network, only in an event said user computer is connected to said enterprise server via at least one of said Local Area Network (LAN), Wide Area Network (WAN) and Intranet;

characterizing said user computer as a trusted device only in an event said user computer is connected to said enterprise server via at least one of said Local Area Network (LAN), Wide Area Network (WAN) and Intranet; and enforcing said first security context on transmission of said IP datagrams between said user computer and said enterprise server, via said micro-segmentation policy, as long as said user computer is determined to be connected to said enterprise server via at least one of said Local Area Network (LAN), Wide Area Network (WAN), and Intranet.

3. The method as claimed in claim 1, wherein the step of characterizing said user computer as a remote user computer, further includes the following steps:

determining whether said user computer is connected to said enterprise server via a virtual private network;

only in an event said user computer is determined to be connected to said enterprise server via said virtual private network, identifying a VPN endpoint on said virtual private network through which said user computer is connected to said enterprise server, and designating said VPN endpoint as said proxy device;

enforcing said reconfigured micro-segmentation policy on transmission of said IP datagrams between said remote user computer, said proxy device and said enterprise server, in-line with said second security context, until said remote user computer ceases to communicate with said enterprise computer via said proxy device;

programming said reconfigured micro-segmentation policy, at least in part, to incorporate therein a forward route policy enforceable on said proxy device, said forward route policy, upon enforcement, configured to enable said proxy device to selectively forward transmit said IP datagrams received from said remote user computer, to said enterprise server.

4. A computer-implemented system for creating and enforcing at least one contextual micro-segmentation policy on a user computer communicably connected to an enterprise server via a pre-established, secured enterprise network, said system comprising:

at least one processor;

at least one memory module storing computer program code, and communicably coupled to said processor, wherein said memory module and said computer program code stored therein are configured, with said processor, to cause said computer-implemented system to:

identify contextual information corresponding to a network connection established between said user computer and said enterprise server via said pre-established, secured enterprise network, and determine, based on said contextual information, at least a first device location corresponding to said user computer;

determine, based on said contextual information, whether said first device location is a location internal to said enterprise network, and only in an event said first device location is determined to be a location internal to said enterprise network, define a first security context based on said first device location, and render said first security context to be responsive to a change in said first device location;

create said at least one micro-segmentation policy in-line with said first security context, and configure said micro-segmentation policy to enforce said first security context on said user computer and said enterprise server, only as long as said user computer is determined to be located at said first device location, and selectively facilitate transmission of IP datagrams between said user computer and said enterprise server, in-line with said first security context;

continually monitor said contextual information corresponding to said network connection, to identify at least one change in said contextual information, and determine, based on said at least one change in said contextual information, whether said user computer has migrated to a second device location different from said first device location;

only in an event said user computer is determined to have migrated to said second device location, determine whether said second device location is a location external to said enterprise network;

only in an event said user computer is determined to be external to said enterprise network, determine whether said user computer is triggering a proxy device from said second device location to connect to said enterprise server;

in response to determining that said user computer is triggering a proxy device from said second device location to connect to said enterprise server, characterize said user computer as a remote user computer, and modify, in real-time, and at least in part, said first security context, and dynamically generate a second security context, said second security context consistent with migration of said user computer from said first device location to said second device location, and consequentially from within said enterprise network to outside said enterprise network, and with characterization of said user computer as said remote user computer; and dynamically reconfigure said micro-segmentation policy in-line with said second security context, such that said reconfigured micro-segmentation policy is enforced on said proxy device and is rendered applicable to said IP datagrams transmitted from said remote user computer to said enterprise server via said proxy device, for facilitating selective transmission of said IP datagrams between said remote user computer and said enterprise server via said proxy device, and wherein a predetermined IP services switch (IPSS) translates said IP datagrams transmitted from said remote user computer and embeds within each of said IP datagrams, a translated source IP address and a translated source port number;

and wherein said memory module and said computer program code stored therein are further configured, with said processor, to cause said computer-implemented system to:

embed within said reconfigured micro-segmentation policy, an internal source IP address and an internal source port number preassigned to an enterprise gateway communicably coupled to said enterprise server; and configure said enterprise gateway to replace said translated source IP address and said translated source port number assigned to said IP datagrams with said internal source IP address and said internal source port number, thereby nullifying a network address translation (NAT) previously performed on each of said IP datagrams by said IP services switch (IPSS) and rendering each of said IP datagrams uniquely identifiable at said enterprise gateway, based on said internal source IP address and said internal source port number, and further rendering said reconfigured micro-segmentation policy enforceable on each of said IP datagrams, based on said internal source IP address and said internal source port number.

5. The computer-implemented system as claimed in claim 4, wherein said processor is further configured to:

identify whether said user computer is connected to said enterprise server via at least one of a Local Area Network (LAN), Wide Area Network (WAN) and Intranet;

identify said first device location as within said enterprise network, only in an event said user computer is connected to said enterprise server via at least one of said Local Area Network (LAN), Wide Area Network (WAN) and Intranet;

characterize said user computer as a trusted device only in an event said user computer is connected to said enterprise server via at least one of said Local Area Network (LAN), Wide Area Network (WAN) and Intranet; and enforce said first security context on said data transmission between said user computer and said enterprise server, via said micro-segmentation policy, as long as said user computer is determined to be connected to said enterprise server via at least one of said Local Area Network (LAN), Wide Area Network (WAN), and Intranet.

6. The computer-implemented system as claimed in claim 4, wherein said processor is further configured to:

determine whether said user computer is connected to said enterprise server via a virtual private network;

characterize said user computer as said remote user computer, only in an event said user computer is determined to be connected to said enterprise server via said virtual private network, and if a VPN endpoint located on said virtual private network is designated as said proxy device;

enforce said reconfigured micro-segmentation policy on transmission of said IP datagrams between said remote user computer, said proxy device and said enterprise server, in-line with said second security context, until said remote user computer ceases to communicate with said enterprise computer via said proxy device;

program said reconfigured micro-segmentation policy to incorporate therein a forward route policy enforceable on said proxy device, wherein said forward route policy, upon enforcement, is configured to enable said proxy device to selectively forward transmit said IP datagrams received from said remote user computer, to said enterprise server, via said proxy device, in line with said second security context.

7. A non-transitory computer-readable storage medium having computer-readable instructions stored thereupon, said computer-readable instructions when read and executed by a computer processor, cause the computer processor to:

identify contextual information corresponding to a network connection established between a user computer and an enterprise server via a pre-established, secured enterprise network, and determine, based on said contextual information, at least a first device location corresponding to said user computer;

determine, based on said contextual information, whether said first device location is a location internal to said enterprise network, and only in an event said first device location is determined to be a location internal to said enterprise network, define a first security context based on said first device location, and render said first security context to be responsive to a change in said first device location;

create a micro-segmentation policy in-line with said first security context, and configure said micro-segmentation policy to enforce said first security context on said user computer and said enterprise server, only as long as said user computer is determined to be located at said first device location, and selectively facilitate transmission of IP datagrams between said user computer and said enterprise server, in-line with said first security context;

continually monitor said contextual information corresponding to said network connection, to identify at least one change in said contextual information, and determine, based on said at least one change in said contextual information, whether said user computer has migrated to a second device location different than said first device location;

only in an event said user computer is determined to have migrated to said second device location, determine whether said second device location is a location external to said enterprise network;

only in an event said user computer is determined to be external to said enterprise network, determine whether said user computer is triggering a proxy device from said second device location to connect to said enterprise server;

in response to determining that said user computer is triggering a proxy device from said second device location to connect to said enterprise server, characterize said user computer as a remote user computer, and modify, in real-time, and at least in part, said first security context, and dynamically generate a second security context, said second security context consistent with migration of said user computer from said first device location to said second device location, and consequentially from within said enterprise network to outside said enterprise network, and with characterization of said user computer as said remote user computer; and dynamically reconfigure said micro-segmentation policy in-line with said second security context, such that reconfigured micro-segmentation policy is enforced on said proxy device and is rendered applicable to said IP datagrams transmitted from said remote user computer to said enterprise server via said proxy device, for facilitating selective transmission of said IP datagrams between said remote user computer and said enterprise server via said proxy device, and wherein each of said IP datagrams is translated by a predetermined IP services switch (IPSS) and embedded with a translated source IP address and a translated source port number:

and wherein said computer-readable instructions when read and executed by said computer processor, further cause the computer processor to:

embed within said reconfigured micro-segmentation policy, an internal source IP address and an internal source port number preassigned to an enterprise gateway communicably coupled to said enterprise server: and configure said enterprise gateway to replace said translated source IP address and said translated source port number assigned to said IP datagrams with said internal source IP address and said internal source port number, thereby nullifying a network address translation (NAT) previously performed on each of said IP datagrams by said IP services switch (IPSS) and rendering each of said IP datagrams uniquely identifiable at said enterprise gateway, based on said internal source IP address and said internal source port number, and further rendering said reconfigured micro-segmentation policy enforceable on each of said IP datagrams, based on said internal source IP address and said internal source port number.

8. The non-transitory computer-readable storage medium as claimed in claim 7, wherein said computer-readable instructions are further configured to trigger said computer processor to:

identify whether said user computer is connected to said enterprise server via at least one of a Local Area Network (LAN), Wide Area Network (WAN), and Intranet;

identify said first device location as within said enterprise network, only in an event said user computer is connected to said enterprise server via at least one of said Local Area Network (LAN), Wide Area Network (WAN) and Intranet;

categorize said user computer as a trusted device only in an event said user computer is connected to said enterprise server via at least one of said Local Area Network (LAN), Wide Area Network (WAN) and Intranet;

enforce said first security context on said data transmission between said user computer and said enterprise server, via said micro-segmentation policy, as long as said user computer is determined to be connected to said enterprise server via at least one of said Local Area Network (LAN), Wide Area Network (WAN) and Intranet;

determine whether said user computer is connected to said enterprise server via a virtual private network;

characterize said user computer as said remote user computer, only in an event said user computer is determined to be connected to said enterprise server via said virtual private network, and if a VPN endpoint located on said virtual private network is designated as said proxy device;

enforce said reconfigured micro-segmentation policy on transmission of said IP datagrams between said remote user computer, said proxy device and said enterprise server, in-line with said second security context, until said user computer ceases to communicate with said enterprise server via said proxy device.

* * * * *